Mar. 6, 1923.                                                          1,447,499.
W. B. WILLS.
CULINARY IMPLEMENT.
FILED NOV. 24, 1922.
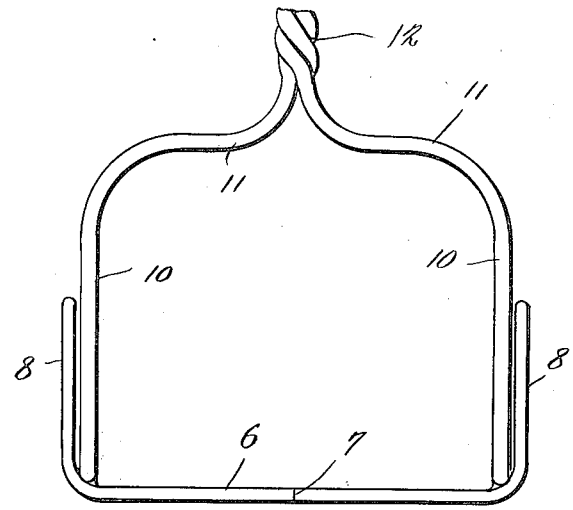
Fig. 2.
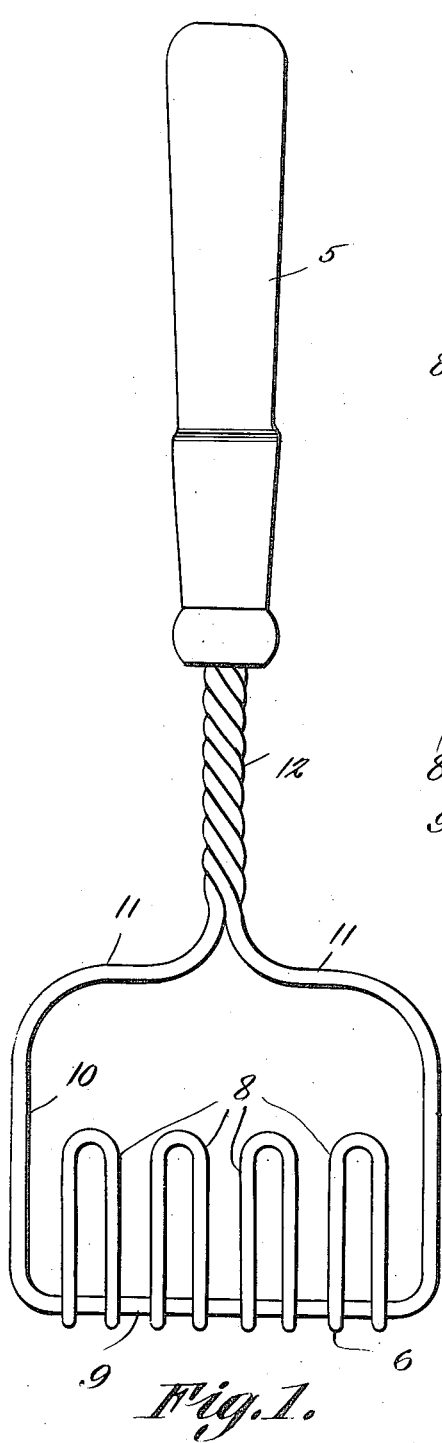
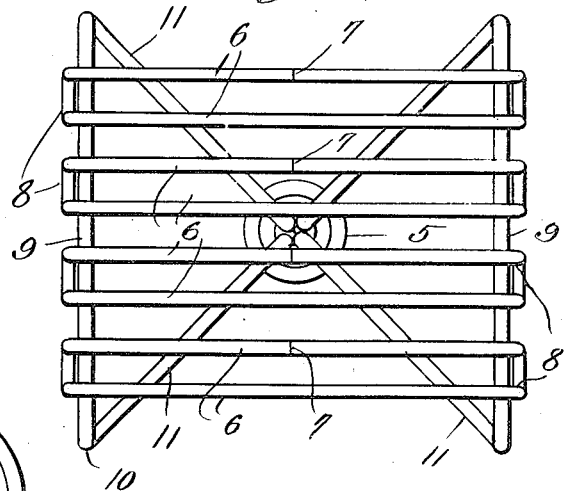
Fig. 3.
Fig. 1.
Walter Bruce Wills,
Inventor
By E. Chalton Brewington
Attorney.

Patented Mar. 6, 1923.

1,447,499

UNITED STATES PATENT OFFICE.

WALTER BRUCE WILLS, OF BALTIMORE, MARYLAND.

CULINARY IMPLEMENT.

Application filed November 24, 1922. Serial No. 602,961.

*To all whom it may concern:*

Be it known that I, WALTER BRUCE WILLS, a citizen of the United States, residing at Baltimore city, State of Maryland, have invented certain new and useful Improvements in Culinary Implements, of which the following is a specification.

This invention relates to culinary utensils, and its object is to provide a novel and improved utensil of this kind which can be used for a variety of purposes, such as beating eggs, mashing potatoes, lifting and draining vegetables, etc.

A further object of the invention is to provide a culinary utensil which shall, with the exception of its handle, be entirely constructed of wire, the various parts being so constructed and arranged that their assembly may be readily effected without the use of a complicated and expensive machine.

With the objects stated in view, the invention consists in a combination and arrangement of parts to be hereinafter described and claimed, and in order that the same may be better understood, reference is had to the accompanying drawing, wherein:—

Figure 1 is an elevation of the utensil viewed from one side;

Figure 2 is an elevation of a fragment thereof viewed from another side; and

Figure 3 is an inverted plan view.

The utensil comprises, essentially, a handle and an open-work article supporting member. The handle is shown at 5 and it may be formed of wood. The article supporting member is made of wire and it is composed of an open-work bottom and similar end walls. The bottom consists of a number of separate pieces of wire, each of which is bent into an elongated loop to form two parallel and spaced cross-bars 6, as clearly shown in Figure 3. The wire is suitably joined at its ends as shown at 7. At each end of the loop, is made an upward bend 8, whereby there are produced the end walls at two opposite ends of the bottom.

Each looped wire unit has these upward bends forming the end walls.

The hereinbefore described wire units are secured adjacent to their ends, by a spot-welding or other process, to cross bars 9 which are also made of wire. These wires 9 have upward bends 10 at their ends terminating in lateral bends 11 which converge and are joined by being twisted together, as shown at 12. This twisted portion of the wires forms a shank to which the handle 5 is attached in any suitable manner, such as providing the handle with an axial hole and inserting and securing the shank therein.

The manner of forming the bottom of the utensil and uniting the same to the cross bars 9 permits assembly of these parts without the use of a complicated and expensive machine, and the other parts of the utensil can also be easily and cheaply produced and assembled.

The open-work construction of the bottom and end walls permits the utensil to be used for lifting and draining vegetables, the same resting on the bottom and being retained thereon by the end walls. The utensil can also be used as a potato-masher and egg-beater, and it effectually serves the purpose for which it has been designed.

What is claimed as new is:—

1. A culinary utensil comprising a bottom member composed of a plurality of separate wire units each of which is bent into the form of a loop and the loop having upward bends to form end walls, and cross wires to which the units are connected adjacent to their ends, said cross wires having upward bends which are brought together to form a handle shank.

2. A culinary utensil comprising a bottom member composed of a plurality of separate wire units each of which is bent into the form of a loop and the loop having upward bends to form end walls, and cross wires to which the units are connected adjacent to their ends, said cross wires having upward bends, terminating in inward bends which converge and are twisted together to form a handle shank.

In testimony whereof I affix my signature.

WALTER BRUCE WILLS.